United States Patent
Mendal et al.

(10) Patent No.: US 9,265,233 B2
(45) Date of Patent: Feb. 23, 2016

(54) DEGRADABLE ANIMAL CHEW TOY

(71) Applicant: Spectrum Brands, Inc., Middleton, WI (US)

(72) Inventors: Isaac Mendal, Deerfield Beach, FL (US); Augusto Urbina, Bogota (CO)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 14/067,295

(22) Filed: Oct. 30, 2013

(65) Prior Publication Data

US 2014/0048018 A1  Feb. 20, 2014

Related U.S. Application Data

(62) Division of application No. 13/296,484, filed on Nov. 15, 2011, now Pat. No. 8,613,261.

(60) Provisional application No. 61/416,055, filed on Nov. 22, 2010, provisional application No. 61/475,744, filed on Apr. 15, 2011.

(51) Int. Cl.
    *A01K 29/00* (2006.01)
    *A01K 11/00* (2006.01)
    *A23K 1/18* (2006.01)

(52) U.S. Cl.
    CPC ............. *A01K 15/026* (2013.01); *A23K 1/1853* (2013.01)

(58) Field of Classification Search
    CPC . A01K 15/025; A01K 15/026; A23K 1/1846; A23K 1/1853
    USPC .............. 119/709, 710, 711, 707; 426/55, 56; 435/265
    See application file for complete search history.

(56) References Cited

U.S. PATENT DOCUMENTS

| | | | |
|---|---|---|---|
| 3,939,040 A | 2/1976 | Monsheimer et al. |
| 4,145,447 A | 3/1979 | Fisher et al. |
| 4,333,731 A | 6/1982 | Schindlmayr et al. |
| 4,364,925 A | 12/1982 | Fisher |
| 4,457,759 A | 7/1984 | Fekete et al. |
| 4,614,520 A | 9/1986 | Ibello et al. |
| 4,968,621 A | 11/1990 | Pfleiderer et al. |
| 5,114,704 A | 5/1992 | Spanier et al. |
| 5,310,541 A | 5/1994 | Montgomery |
| 5,670,369 A | 9/1997 | Fink et al. |
| 5,710,040 A | 1/1998 | Christner et al. |
| 5,834,299 A | 11/1998 | Andersen |
| 6,223,693 B1 | 5/2001 | Perlberg et al. |
| 6,708,531 B1 | 3/2004 | Thanikaivelan et al. |
| 6,827,041 B2 | 12/2004 | Hague et al. |

(Continued)

FOREIGN PATENT DOCUMENTS

| | | |
|---|---|---|
| GB | 929137 | 9/1961 |
| GB | 1201683 | 8/1970 |
| WO | 2012028112 A1 | 3/2012 |

*Primary Examiner* — Trinh Nguyen

(74) *Attorney, Agent, or Firm* — Merchant & Gould P.C.

(57) ABSTRACT

A chew for a domestic animal comprises one or more sheets of a chewable bovine rawhide formed into a shape suitable for chewing by a domestic animal, wherein the one or more sheets has a mass loss of at least 45% as measured by the Degradability Standard Test Protocol. The bovine rawhide is made with a process that includes treatment with an enzyme. A process of making a pet chew from a split bovine hide comprises treating the split bovine hide with an enzyme solution.

17 Claims, 2 Drawing Sheets

(56) References Cited

U.S. PATENT DOCUMENTS

| | | |
|---|---|---|
| 6,886,497 B1 | 5/2005 | Hague |
| 6,957,554 B2 | 10/2005 | Saravanabhavan et al. |
| 7,691,426 B2 | 4/2010 | Axelrod et al. |
| 2004/0187794 A1 | 9/2004 | Nakata |
| 2004/0244720 A1 | 12/2004 | Jia |
| 2004/0244721 A1* | 12/2004 | Tepper et al. ............ 119/710 |
| 2007/0148104 A1 | 6/2007 | Goettert et al. |
| 2007/0292484 A1 | 12/2007 | Levin |
| 2008/0003270 A1 | 1/2008 | Garcia Martinez |
| 2008/0122133 A1 | 5/2008 | Zheng |

\* cited by examiner

DEGRADABLE ANIMAL CHEW TOY

CROSS-REFERENCE TO RELATED APPLICATIONS

This application is a divisional of U.S. patent application Ser. No. 13/296,484, filed Nov. 15, 2011, which claims the benefit of U.S. Provisional Patent Application Nos. 61/416,055, filed Nov. 22, 2010, and 61/475,744, filed Apr. 15, 2011, all of which are incorporated herein by reference in their entirety.

BACKGROUND OF THE INVENTION

1. Field of the Invention

This invention relates to chew toys for domestic animals. In one of its aspects, the invention relates to chew toys that have improved degradability. In another of its aspects, the invention relates to a chew toy made of rawhide that retains the toughness and 'chewability' of conventional rawhide chews, thus satisfying the animal's instinctive need to chew, with improved degradability 2. Description of the Related Art Products for consumption by pets can be evaluated based on a number of characteristics, including entertainment value, chew resistance, toughness, longevity, degradability, nutritional value, and in some cases digestibility, which is related in part to nutritional value. As used herein, digestibility of a substance is defined as a measure of how well the substance is absorbed by the animal's body. Degradability is defined as a measure of how quickly and completely a substance breaks down in the animal's digestive system.

Using these characteristics, products made for pet consumption can generally be classified into two categories. The first category includes food and treats that provide nutritional value to the animal. These products are highly digestible and degradable due to their structural characteristics, but are consumed quickly and do very little to entertain the animal or to satisfy the animal's instinctive need to chew. While they may provide some dental benefits when supplemented with specialized enzymes or other additives, they provide very little mechanical action to clean the teeth or stimulate the gums. The second category includes chew toys and chew resistant articles that provide the 'chewability' needed to satisfy the animal's need to chew, and provide the dental benefits and entertainment value that the food and treats of the first category lack. These products are typically made of rawhide pieces which have little or no food value and do not add calories to the animal's diet. These pieces are eventually broken down into small pieces that may be swallowed by the animal and passed through the digestive system of the animal.

A process of making chew toys from untanned bovine skin (rawhide) is well known. In this process, the cattle hides are received from the slaughterhouse with blood, tallow, and flesh on them. The hides are washed and de-haired. De-hairing is achieved chemically using lime and sulfite. Soda ash may also be used in the de-hairing step as a degreaser. The de-hairing process may also employ the use of enzymes that break down creatine to aid hair removal. After de-hairing, the flesh and excess fat is removed and the hides are split into two layers. The top layer is known as the top grain layer. This layer is often tanned and used for footwear, belts, leather, and apparel. The bottom layer is known as the split layer and is the layer commonly used to make articles like suede, gelatin, collagen and chew toys. In the conventional process, untanned rawhide (either top grain or split layer) is further processed using salt, sulfate, and degreaser. The hides may then be bleached with hydrogen peroxide and treated with titanium dioxide before being formed into shaped chew toys and dried.

With a conventional rawhide chew toy, if the dose is not controlled, for example an animal is given too much rawhide, there may be a build-up of rawhide in the animal's digestive system due to the lack of degradability of the rawhide. The build-up of rawhide in the animal's digestive system can cause digestive distress or discomfort to the animal and can sometimes require veterinary care.

One proposed solution to this problem is to break up the rawhide and incorporate it into pet treats or pet food products to make them more chewable. The breakdown of the hide can be achieved mechanically, through the use of chemical processes using enzymes as catalysts, or by using a combination of mechanical and chemical processes. U.S. Pat. No. 4,364,925 to Fisher discloses methods for preparing fibrous collagens from hides by treating comminuted hides with dilute acid in the presence of a proteolytic enzyme. The collagen is then incorporated into a molded pet food product and hardened. Similarly, U.S. Pat. No. 4,145,447 to Fisher et al. discloses compacting wetted animal food under pressure with fibers, such as collagen fibers, and baking the product to form a chew-resistant dog treat. U.S. Pub. No. 2008/0003270 to Garcia Martinez and U.S. Pub. No. 2008/0122133 to Zheng disclose additional methods for mechanically breaking the collagen fibers (through milling or grinding), treating them with solutions including enzymes, and reconstituting the product into chewable dog treats.

GB 929137 to Nihon Hikaru Kabushiki Kaisha discloses a method of using enzyme treatments and acid extraction to solubilize collagen fibers in the skin of adult animals. The method produces a colloidal solution of insoluble collagen fibers in a fiber-reproducible state. The solution is then treated with an alkali to reproduce the collagen fibers. Treats and food products that are produced using these processes are more chew-resistant than conventional treats in that they are harder and require more pressure to break. However, because the collagen fibers are mechanically broken, they lack the toughness and 'chewability' of rawhide products. As a result, these products are consumed more quickly by the animal, do not provide the dental benefits of rawhide, and do not satisfy the dog's proclivity for chewing.

To address these issues, pigskins, which are more digestible to animals than rawhide, have been used as a substitute for rawhide for making chew toys. U.S. Pat. No. 6,827,041 to Hague et al. discloses a method of processing pigskins for use in chew toys and treats in which the pigskins are treated with an alkali paste and washed with a pancreatic enzyme to soften the skins. Similarly, U.S. Pub. No. 2007/0292484 to Levin discloses a method that includes treating pigskin with an alkali and enzyme mixture to dissolve the colloidal protein to prepare the pigskin for use in making pet treats. While pigskin products are more digestible than rawhide products, they are more expensive to produce and tend to be thinner and softer than rawhide. As a result, they do not have the chewability of rawhide made from bovine hides and thus do not provide the chew resistance and as much tartar control as bovine rawhide.

U.S. Pat. No. 6,223,693 to Perlberg et al. discloses a process for soaking untanned animal hides in a humectant to produce a softer rawhide product. While this product makes the rawhide softer and easier for older animals to chew, it has no affect on the collagen fibers themselves and, for that reason, it fails to improve the degradability of the rawhide in the animal's digestive tract.

Still other alternatives involve the addition of enzymes to traditional pet foods or treats to provide additional functionality when the product is consumed. U.S. Pat. No. 5,310,541 to Montgomery discloses a chewable and consumable composition that contains a compound which, when it comes into contact with saliva, forms an antimicrobial agent. The preferred carrier is described as rawhide. Similarly, U.S. Pub. No. 2007/0148104 Goettert et al. discloses a pet article (which can include rawhide or biscuits) that improves the dental health of animals. The article can comprise an edible chew base and effective levels of antimicrobial compositions. In one embodiment, the use of a therapeutic enzyme that decomposes harmful carbohydrates, proteins, lipids and bacterial substrates in the pet's mouth is disclosed. In addition, U.S. Pat. No. 7,691,426 to Axelrod et al. discloses a chew toy which incorporates an edible resin and rawhide. The edible resin composition may include starch, gluten, vegetable based protein, carbohydrate or fat based products that supplement the animal's nutritional feeding regime. The resin may include enzymes and/or co-enzymes. While these types of alternatives may improve the dental or nutritional benefits of pet treats, they do not provide a safe, degradable, chew toy while maintaining the 'chewability,' mechanical teeth-cleaning action, and extended chewability of rawhide.

Methods have also been disclosed for producing artificial rawhide. U.S. Pub. No. 2004/0187794 to Nakata discloses a method of making artificial rawhide to improve the efficiency and cost-effectiveness of the dog chew process. The natural rawhide is decomposed, either mechanically or with the help of an enzyme. The collagen fibers are then blended with a binder and water and extruded to form a sheet of artificial rawhide.

It is well known in the art that enzymes are used for various purposes during the tanning process. U.S. Pat. No. 4,968,621 to Pfleiderer et al. discloses a process for the wet degreasing of hides using enzymes, also called bating, which is also carried out in the presence of synthetic surfactants. U.S. Pat. No. 5,710,040 to Christner et al. discloses that proteolytic enzymes can be used to more quickly rehydrate the skins that are delivered dry and to more completely degrease the skins and also, after soaking, to provide a smoother, cleaner, and softer hide. Proteases also support loosening of the hair from the skin. U.S. Pat. No. 4,614,520 to Ibello et al. also discloses the use of enzymes as part of a bating step after liming to soften the hides. U.S. Pat. No. 4,457,759 to Fekete et al. discloses a process for treating hides which includes the use of enzymes in de-hairing. Enzyme use for removal of hair is further disclosed in U.S. Pat. No. 6,957,554 to Saravanabhavan et al., U.S. Pat. No. 3,939,040 to Monsheimer et al., U.S. Pat. No. 6,708,531 to Thanikaivelan et al., and U.S. Pat. No. 5,834,299 to Andersen. Finally, U.S. Pat. No. 5,670,369 to Fink et al. discloses that it is known to use enzymes to treat hides to solubilize collagen, which can then be extracted and used for purposes such as medical implants.

SUMMARY OF THE INVENTION

According to the invention, a chew for a domestic animal comprises one or more sheets of a chewable bovine rawhide made from a clean, split bovine hide that has been washed and de-haired and formed into a shape suitable for chewing by a domestic animal, wherein the one or more sheets have been treated to provide a chew having a mass loss of at least 45% as measured by the Degradability Standard Test Protocol.

In one embodiment, the one or more sheets of rawhide have a mass loss of at least 50% as measured by the Degradability Standard Test Protocol. Preferably, the one or more sheets of rawhide have a mass loss of at least 60% as measured by the Degradability Standard Test Protocol.

In another embodiment, the bovine rawhide sheets are knotted into a bone-like configuration.

In yet another embodiment, the one or more sheets of rawhide has been made with a process that includes treatment with an enzyme solution for a time and temperature to improve the degradability of the bovine rawhide without significantly affecting the chewable quality of the hide.

Preferably, the bovine rawhide is made with a process that includes treatment with at least one enzyme selected from the group of oxidoreductase, transferase, hydrolase, lyase and isomerase enzyme classes and combinations thereof. The oxidoreductase enzyme can be at least one of a peroxidase, catalase, glucose oxidase, laccase and combinations thereof. The transferase enzyme can be at least one of a fructosyl transferase, glucosyl transferase and combinations thereof. The hydrolase enzyme can be at least one of a lipase, protease, glycosylase and combinations thereof. More specifically, the hydrolase enzyme can be at least one of trypsin, chymotrypsin, pepsin and combinations thereof. In another embodiment the hydrolase enzyme can be at least one of a collagenase, a gelatinase and combinations thereof. In yet another embodiment, the hydrolase enzyme can be at least one of a serine peptidase, cysteine peptidase, threonine peptidase, glutamic peptidase, aspartic peptidase, metallopeptidase and combinations thereof. The lyase enzyme can be at least one of a pectin lyase, pectate lyase, acetolactate decarboxylase and combinations thereof. The isomerase enzyme can be at least one of a glucose isomerase, xylose isomerase and combinations thereof.

In one embodiment, a thickness of the one or more sheets of rawhide is greater than 0.5 mm. In another embodiment, a thickness of the one or more sheets of rawhide is between approximately 1.6 to 1.8 mm.

In another embodiment, the one or more sheets of rawhide has been made with a process that includes treatment with a deliming solution prior to treatment with an enzyme solution followed by washing of the one or more sheets to remove the enzyme solution.

DESCRIPTION OF THE PREFERRED EMBODIMENT

Figure 1:
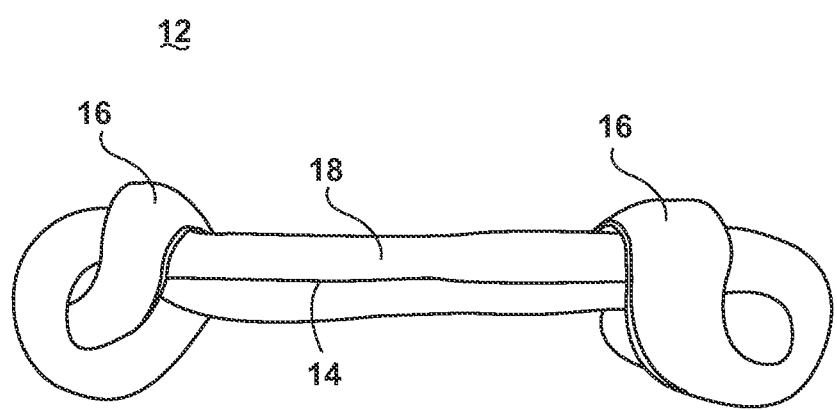
FIG. 1 is a perspective view of a typical rawhide chew toy in the form of a bone according to a first embodiment of the invention.

Referring now to FIG. 1, an exemplary chew toy 12 in the shape of a bone, such as may be given to dogs, is formed of one or more layers 14 of rawhide that has been treated to make it soft and pliable during wet processing. As used herein, the term "rawhide" means bovine hide that has been separated from top grain. The soft pliable rawhide layers 14 while wet are folded lengthwise and then tied into knots 16 at the ends thereof. The knots 16 are separated by a central portion 18. The chew toy 12 is then dried to form a relatively hard article. This chew toy 12 looks like a typical rawhide bone and has the chewable characteristics of typical dog chew toys. The chew toy 12 is relatively hard and softens when chewed by a dog due to the release of saliva onto the chew toy 12, similar to conventional rawhide dog chew toys. The chew toy can have any desired form such as an unknotted roll, a strip, a twisted strip, a donut, a braid, a pretzel, a shoe, a baseball, a football, a bow or any other shape.

As used herein, the term "chewable" means that quality of an article that is typically hard but becomes soft and pliable when chewed by an animal, such as a domestic dog, yet is tough and resistant to separating, breaking and tearing, and thus can be masticated by an animal such as a dog. Thus, the dog can chew the article for many hours, while exercising its jaws and at the same time can clean its teeth and massage its gums. Chewability is a characteristic of bovine rawhide articles that have been processed in a conventional manner to form chew toys and is contrasted to baked articles and treats that fracture or are torn when chewed by a domestic animal, such as a dog. A chewable article is distinguished from baked articles that are usually commutated ingredients, including rawhide, that have a binder and that are baked to form a hard article. These baked articles do not have the chewability of rawhide chew toys because they fracture easily when chewed by an animal into smaller pieces that are ingested by the animal.

Typically, the thickness of the processed piece of rawhide, according to the invention, that is shaped into the chew toy is greater than 0.5 mm, preferably 1.6-1.8 mm, to provide the chew toy with the desired chewability. The thickness can vary throughout the chew toy depending on the form of the chew toy and can also vary depending on the size of the animal the chew toy is intended for.

The exemplary chew toy 12 has enhanced degradability when compared with chew toys made according to the conventional processes described in the prior art. As used herein, the term, "degradability factor" of a chew is a measure of the degree that a particular chew toy breaks down in the stomach of a dog within a four hour time period. It is believed that ingested particles typically remain in the stomach of a dog for at least four hours. As used herein, degradability is measured as the percentage of mass lost by a pet chew within a four hour time period under simulated stomach conditions. Typically, the mass loss percentage of the conventional rawhide dog chews is from 25-40% at best, depending on the thickness of the rawhide. The rawhide dog chews according to the embodiments of the invention have a mass loss percentage of about 60%, as measured by the standard degradability tests conducted as set forth in the protocol below. Comparing like samples of common thickness, the enzyme treated rawhide samples typically have at least about 20% improvement over untreated rawhide samples.

The invention is not limited to any shape chew and thus can be any shape that is desired for use with domestic animal.

Figure 2:
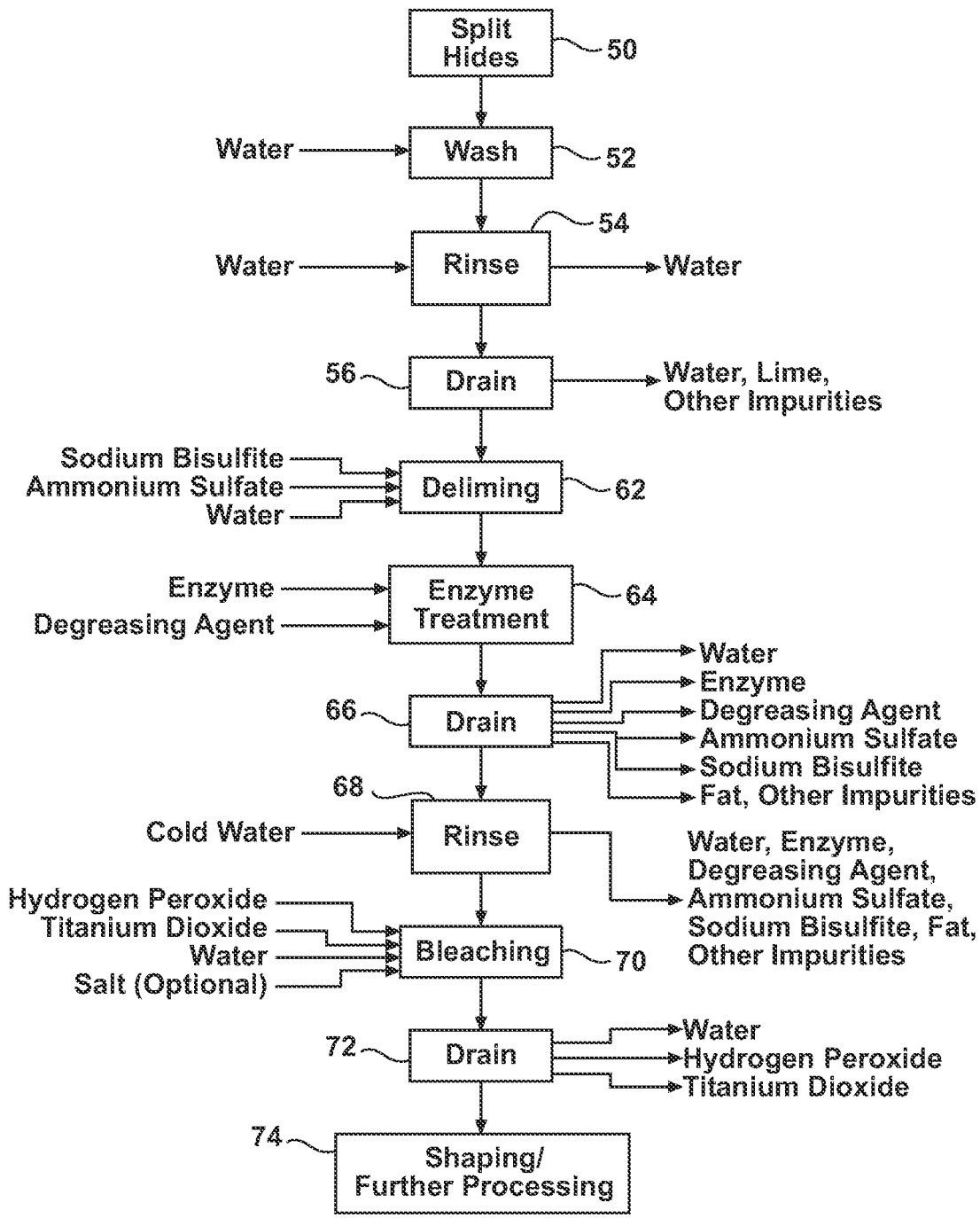
FIG. 2 is a flow diagram of a process for making a chew toy according to a second embodiment of the invention.

Referring now to FIG. 2, a process of making the rawhide dog chews according to the invention will now be described. The degradable pet chew 12 as described above is achieved by treating the rawhide with enzymes that begin the breakdown of the collagen fibers to speed the degradation of the chew toy 12 once it has been ingested by the animal. The enzyme application occurs under controlled conditions to achieve the desired level of enzyme activity and achieve optimal results. The process uses bovine hides 50 that have been washed, de-haired, and split. While either the top grain or split layer can be used, the preferred embodiment uses the split layer of the hide due to economic reasons. The whole hide can be used or alternatively, only portions of the hide, such as the shoulders and belly, for example, can be used.

In the following description, all percentages given are by weight and are based on the weight of the hides prior to treatment. The details of the process set forth below are exemplary and can vary over a wide range without departing from the invention.

The hides 50 are washed in step 52. The water used in wash step 52 is at a higher temperature than in the conventional wash step process in making pet chews, typically 20-45° C., but ideally 35-40° C. The hides are rinsed in step 54 and drained in step 56. The hides are then subjected to a deliming process 62 known to those skilled in the art of dog chew preparation. In this step, the hides are washed with a mixture of water and deliming agents, such as sodium bisulfite and ammonium sulfate, for example. After the hides have been washed with the deliming solution, one or more enzymes, such as hydrolase enzymes, are added to the drum in step 64. The hides are then washed with the enzyme and deliming solution in step 64. The enzymes used in the process are chosen to break down the collagen in the hides to a predetermined extent so that the hides retain their chewability qualities but with a lower collagen content. Additional components, such as a degreasing agent, can also be added to the solution. The softness of the hides is monitored throughout the enzyme treatment step 64 by a tactile test by an experienced operator. Once the hides have reached the necessary softness, the enzyme solution is drained at step 66 and the hides are thoroughly rinsed in cold water (20° C.) at step 68. The low temperature of the rinse water and the thorough rinsing step at 68 tend to stop the enzyme activity to provide the targeted level of product chewability. The hides are then bleached and whitened in accordance with the conventionally-known process at step 70. Optionally, salt may also be added at this step in the process to enhance flavor. After bleaching, the hides are drained at step 72, shaped into pet chews, and dried according to conventional processes in step 74.

Deliming Process 62:

The deliming process 62 is similar to the deliming process well known to those skilled in the art. The hides are washed in a solution comprised of water and one or more deliming agents, such as ammonium sulfate, ammonium chloride, or sodium bisulfite. In an exemplary embodiment, the concentration of sodium bisulfate can range from 0.03 to 3.0%. Contrary to a conventional deliming process, the temperature of the water used in the deliming solution is higher in order to raise the temperature of the hides in preparation for the enzyme application. The water temperature used should be at least 20-45° C., preferably 30-45° C., and ideally 35-38° C. The pH of the solution is generally between 8.0 and 11.0, preferably between about 8.5 and 9.0. If necessary, more deliming agent is added to the solution to bring the pH into the desired range. Both temperature and pH are factors that can affect the activity of the enzyme during enzyme treatment of the hides at step 64. The temperature and pH can be adjusted to achieve the desired enzyme activity at step 64, depending on the properties of the enzyme(s) used in the enzyme treatment step 64.

Enzyme Treatment 64:

The enzymes suitable for use in this step of the process include those enzymes that improve the degradability of the rawhide chew in the animal's digestive system. The enzymes can react with one or more components of the hide to break down or modify the component such that the rawhide chew is more degradable in the animal's digestive system. It is also within the scope of the invention for the enzymes to react to generate one or more components which can then react with the hide to break down or soften the hide such that the rawhide chew is more degradable in the animal's digestive system.

One example of a suitable class of enzymes for use in this step are those enzymes that classify as oxidoreductases (Enzyme Class 1, International Union of Biochemistry and Molecular Biology). Non-limiting examples of suitable oxidoreductase enzymes include peroxidases, catalases, glucose oxidases and laccases.

Another example of a suitable class of enzymes includes those enzymes that classify as transferases (Enzyme Class 2, International Union of Biochemistry and Molecular Biology). Non-limiting examples of suitable transferases include fructosyl and glucosyl transferases.

Another example of a suitable class of enzymes includes those enzymes that classify as hydrolases (Enzyme Class 3, International Union of Biochemistry and Molecular Biology). Suitable enzymes include enzymes that catalyze the hydrolysis of proteins, peptides, polypeptides, starches, carbohydrates, fats and lipids, for example. Examples of suitable types of hydrolases include lipases, which catalyze the hydrolysis of lipids and fats, and proteases, which catalyze the hydrolysis of proteins. Non-limiting examples of enzymes that react with carbohydrates, including mono, di, oligo and polysaccharides, include glycosylases such as amylases, cellulases, and pullulanases. Another example are those enzymes classified as exopeptidases or endopeptidases.

Additional examples include those classified according to the MEROPS database as serine, cysteine, threonine, glutamic, aspartic or metallo-peptidases. Non-limiting examples of serine peptidases include chymotrypsin, trypsin, elastase, cathepsins, plasmin, thrombin and subtilisin. Non-limiting examples of cysteine peptidases include actinidain, papain, bromelain, calpains, caspases, cathepsins and Mir1-CP. Non-limiting examples of aspartic peptidases include HIV-1 protease, chymosin, cathepsins, renin, plasmepsin, nepenthesin and pepsin. Non-limiting examples of metallopeptidases include aminopeptidase, collagenase and gelatinase.

In one example, the enzymes can include digestive enzymes which are normally produced in the digestive tract of an animal, such as the mouth, stomach, pancreas and intestines. Non-limiting examples of enzymes suitable for use include digestive enzymes produced by the pancreas, examples of which include trypsin, chymotrypsin, elastase and lipases, and enzymes produced by the stomach, an example of which includes pepsin.

Another example of a suitable class of enzymes includes those enzymes that classify as lyases (Enzyme Class 4, International Union of Biochemistry and Molecular Biology). Non-limiting examples of suitable lyases include pectin lyase, pectate lyase and acetolactate decarboxylase.

Another example of a suitable class of enzymes includes those enzymes that classify as isomerases (Enzyme Class 5, International Union of Biochemistry and Molecular Biology). Non-limiting examples of suitable isomerases include glucose isomerases and xylose isomerases.

The enzyme treatment can include a single type of enzyme or a combination of multiple types of enzymes. The enzymes can be obtained from any mammalian source, such as bovine, porcine, canine, goat and rodent, for example, or plant, bacterial, fungal or protozoan source. It is also within the scope of the invention for synthetic enzymes or molecules that mimic the behavior of an enzyme to be used.

The enzyme treatment process 64 can also include one or more degreasing agents, an example of which includes, Sigmakroal DG505. In an exemplary embodiment, the concentration of pancreatic enzymes can range from 0.03 to 3.0%. The hides are washed in a drum with the enzyme solution 64 for 30 to 120 minutes, preferably 45 to 100 minutes, and ideally about 45 minutes. The softness of the fibers is manually monitored throughout the enzyme application process and the enzyme treatment is completed when the fiber reaches the desired softness. Throughout this process, from the initial wash 52 until the end of the enzymatic treatment 64, warm water (preferably 20-45° C., ideally 35-38° C.) is used in order to achieve the desired level of enzyme activity. The pH of the enzyme solution is typically in the range of 7.5 to 11.0, preferably about 8.5-9.0, although the pH can vary depending on the enzymes present in the enzyme solution.

Bleaching 70:

Bleaching of the hides takes place after the hides have been thoroughly rinsed following the enzyme treatment and is completed according to the process well known to those skilled in the art. The bleaching solution consists of water and bleaching agents, like hydrogen peroxide and titanium dioxide. Optionally, salt may also be added to this step to improve the flavor of the product.

Degradability Standard Test Protocol

Initially, preliminary tests were conducted to determine the optimal time in which the degradability protocol would be conducted. The objective of these tests was to determine the optimal time and the initial degradability velocities of flat rawhide pieces (layer form). The results showed that the rawhide still loses a considerable amount of mass between 3 and 4 hours. Therefore, 4 hours was chosen as an appropriate time parameter for this test procedure to compare rawhide chews prepared using conventional methods and rawhide chews prepared using the method of FIG. 2 described above incorporating an enzyme treatment step.

Further, veterinarians typically believe that the minimal residence time of any food in the stomach of a small dog is 4 hours. Therefore, 4 hours of degradation will be the worst case scenario in the event of a rawhide obstruction (the longer the chew remains in the dog's stomach, the better the chance that the chew will degrade enough to prevent a blockage). For these reasons, the degradability of chews is evaluated by measuring the percentage of dry mass lost under simulated stomach conditions in four hours.

Stomach conditions are simulated using a procedure derived from A.O.A.C. 971.09 $16^{th}$ ed. 1995 (pepsin digestibility method) in conjunction with Absorbable Gelatin USP. The protocol used to evaluate and compare the degradability of chews is as follows:

Sample Preparation:

Samples are cut in into approximately 6 $cm^2$ pieces (6 cm per side) and then weighed. Accuracy in this step is important because the sample surface area is directly proportional to the speed of consumption. All comparative samples in a test should have a common thickness and preferably be taken from a common hide, if possible. The sample should be cut so that the surface area is constant within all samples and the mass of all samples should be equal (<10% mass difference). Sample weights (in grams) should be measured and recorded to four decimal places. There is no need to remove the grease from the sample because the grease content is insignificant.

Digestion:

The sample is treated with an acidic solution and pepsin with constant agitation and at a constant temperature of 45° C. (113° F.), which simulates stomach conditions and is also the temperature of pepsin's maximum activity. The time of treatment has been determined to be four hours. This time is believed to be the minimum time that food remains in the stomach of a dog.

Pepsin Solution:

In accordance with the A.O.A.C. pepsin digestibility method, the pepsin used should have an activity of 1:10000 and be diluted to a concentration of 0.20%. One (1.00) gram of the pepsin should be diluted in 10 ml of 0.075N hydrochloric acid (HCl). The solution should undergo smooth agitation until the pepsin is completely dissolved. Once the pepsin is dissolved, additional 0.075N hydrochloric acid (HCl) is added to bring the pepsin solution volume to 500 ml.

Isothermal Bath:

The bath is prepared at 45° C. (113° F.). Agitation in the bath should be constant and moderate, at about 1 Hz.

Implementation:

Each sample should be submerged in 100 ml of the pepsin and hydrochloric acid solution. The samples and the solution should be placed in hermetic Schott bottles. It is critical that the Schott bottles are sealed to prevent dilution of the pepsin solution with water from the isothermal bath.

Once the isothermal bath has reached 45° C., the sealed Schott bottles should be placed in the bath and agitation should be started. The samples should remain in the bath, at constant agitation and temperature, for four hours.

A control sample should be prepared according to the same procedure, except that the sample should be placed into a Schott bottle with water, instead of the pepsin and hydrochloric acid solution. This sample will be used as a control sample to correct for humidity during the test procedure.

At the end of the four hours, the bottles should be removed and the sample should be washed with an abundant amount of distilled water in order to remove all traces of the acid and pepsin. Washing should be done on filter paper within a funnel.

Drying:

In order to accurately measure the efficiency of the treatment, it is important that the sample is dry so that it is comparable to the sample prior to the digestion process. Drying of the sample should be done in a convection oven at a temperature of about 103° C. The samples should be dried for about twelve hours. The drying receptacle is weighed before and after the sample is placed in the drying. In some cases, after drying, some parts of the sample can become attached to the receptacle.

Mass Loss Calculation:

In order to determine the correct mass loss percentage, a humidity correction factor (Dry Base) is calculated for the sample before entering the pepsin degradation treatment as follows.

% Dry Mass

Since the test samples cannot be dried and weighed before entering digestion, a control sample taken from the same part of the finished bone is weighed and then placed inside the dryer at the same conditions as the samples (103° C. for 12 hours). The % Dry Mass is used as a correction factor to correct for the mass loss that occurs as a result of water loss during the drying process. The % dry mass is calculated using the control sample measurements as follows:

% Dry Mass=(Ctrl In−Ctrl Out)/Ctrl In, where:

Ctrl In=Initial mass of control sample
Ctrl Out=Final mass of control sample (after drying)

The Real Mass of the rawhide samples is then calculated by multiplying the initial mass of the samples by the calculated % Dry Mass. The Real Mass of the rawhide sample is the mass of the sample corrected for the amount of water in the sample that is removed during the drying process of the test procedure.

Real Mass=% Dry Mass×Initial Mass

Mass Loss Percentage

Finally, the mass loss percentage, which will be the criteria to determine the effectiveness of the enzymatic treatments, is calculated as follows:

% Mass Loss=$((M_{in} \times \% \text{ Dry Mass}) - M_{out})/(M_{in} \times \% \text{ Dry Mass})$, which can also be written as:

% Mass Loss=$(\text{Real Mass} - M_{out})/(\text{Real Mass})$ where:

$M_{in}$=Initial mass of sample
$M_{out}$=Final mass of sample (after drying)
$M_{in}$×% Dry Mass=Real initial mass of rawhide

SPECIFIC EXAMPLES

Example 1

Preparation of the Chews

Split layer hides were loaded into a mixing drum, along with enough water to rotate the drum properly. The drum was sealed and rotated for 30 minutes to wash the hides. The hides were then rinsed. During the rinse, the drum door was replaced with a screen that drains water from the drum as it rotates. The drum was rotated for 60 minutes. During that time, warm water with a temperature of 35-40° C. (95-104° F.) was continuously added to the drum. The warm water increased the temperature of the hides in preparation for the enzyme treatment. At the end of the rinse, the flow of water into the drum was stopped and all of the water was drained from the hides. A solution of 200% water (at 35-38° C.), 2.0% ammonium sulfate, and 0.50% sodium bisulfate was added to the hides in the drum, the drum was sealed, and the drum was rotated for 45 minutes. After 45 minutes, the pH was verified to be about 8.5-9 and 0.12% pancreatic enzyme (e.g. a pancreatic trypsin) and 0.1% degreasing agent was added to the existing solution. The drum was sealed and the hides were washed in the enzyme solution for 45 minutes. The softness of the hides was checked by hand throughout the enzyme treatment step. Once the hides had achieved the desired softness, the enzyme solution was drained. The hides then were rinsed with cold water (20° C.) for 60 minutes. The hides were then drained and a short level of water (about 25% of the volume of the hides) was added to the drum, along with 2.5% hydrogen peroxide, 0.05% titanium dioxide and 0.06% salt. The hides were soaked in the bleaching solution for another 5 hours, during which the drum is rotated for 5 minutes every hour. The hides continued to soak overnight before being discharged, shaped into conventional pet chews and dried.

Degradability Evaluation Results

Chew toys as illustrated in FIG. 1 were prepared according to the processes outlined in Table 1 below. The "Untreated" sample was prepared using a conventional process, the "Enzyme Treated" sample was prepared as described in Example 1 above.

Degradability assays were conducted using the Degradability Factor Standard Test Procedure set forth above to evaluate the degradability of sample pieces having an area of 6 cm² and a maximal mass difference of 10% from both 4" knotted rawhide bones and 9" knotted rawhide bones. All the humidity control samples showed that the rawhide has 10% humidity. The results are summarized in Tables 2 and 3 below.

TABLE 1

| | | Example Processes | |
|---|---|---|---|
| | Step | Untreated | Enzyme Treated |
| 1 | Initial Water Wash | 60 minutes | 30 minutes |
| 2 | Rinse | 90 minutes | 60 minutes, water (35-40° C.) |
| 3 | Drain | 30 minutes | 30 minutes |

TABLE 1-continued

Example Processes

| Step | | Untreated | Enzyme Treated |
|---|---|---|---|
| 4 | Deliming | 60 minutes with: Water, 0.057% salt, 0.21% preservative, 0.71% ammonium sulfate, 0.086% degreaser | 45 minutes with: 200% water (35-38° C.), 2.0% ammonium sulfate, 0.5% sodium bisulfite |
| 5 | Enzyme Treatment | | Add 0.12% enzyme and 0.1% degreasing agent to the solution of Step 4 and treat for an additional 45 minutes |
| 6 | Drain and Rinse | 120 minutes wring-wash 60 minutes drain | 60 minutes wring-wash with cold water (20° C.) Drain completely |
| 7 | Bleaching | 90 minutes with: Short bath water, 3.43% hydrogen peroxide, 0.05% titanium dioxide Then soak for 5 hours, moving 5 minutes every hour. Repose overnight. | 60 minutes with: Short bath water with 2.5% hydrogen peroxide, 0.05% titanium dioxide and 0.06% salt Then soak for 5 hours, moving 5 minutes every hour. Repose overnight. |

TABLE 2

Assay with 4" rawhide knotted bones at T = 45° C., t = 4 hrs

| Sample | % Mass Loss |
|---|---|
| Untreated | 36.39% |
| Enzyme Treated | 60.51% |

TABLE 3

Assay with 9" rawhide knotted bones at T = 45° C., t = 4 hrs

| Sample | % Mass Loss |
|---|---|
| Untreated | 35.53% |
| Enzyme Treated | 61.02% |

It is evident that the enzymatic treatment has an appreciable effect on the rawhide degradability when evaluated using the Degradability Factor Standard Test Procedure as set forth above. From the results it is apparent that the enzyme treatment enhances the degradability of the rawhide chew, producing a consistent mass loss of over 50% for the 4" and 9" rawhide samples. The results illustrate that the enzymatic treatment enhances the degradability of the rawhide chew under conditions which simulate a dog's stomach. It is also within the scope of the invention that the enzymatic treatment enhances the degradability of the rawhide chew in other areas of the animal's digestive system, such as the mouth and intestines, for example.

Example 2

Preparation of the Chews

The second example preparation is similar to Example 1 of Table 1, except for the concentration of the sodium bisulfate in step 4 and the enzyme treatment in step 5. In Example 2, at step 4, a solution of 200% water (at 35-38° C.), 2.0% ammonium sulfate, and 0.05% sodium bisulfite was added to the hides in the drum, the drum was sealed, and the drum was rotated for 45 minutes. After 45 minutes, the pH was verified to be about 8.5-9 and in step 5, 0.05% pancreatic enzyme (e.g. a pancreatic trypsin) and 0.1% degreasing agent was added to the existing solution. The drum was sealed and the hides were washed in the enzyme solution for 15 minutes. The remaining steps 6 and 7 are the same as described in Table 1.

The duration of the enzyme treatment, the temperature of the solution during the enzyme treatment, the pH of the solution during enzyme treatment and the amount of enzyme used are all variables that can be adjusted during the enzyme treatment step of the process to effect the degradability of the resulting chew. For example, the hides can be treated with a lower concentration of enzyme for a longer period of time to provide a chew having a degree of degradability similar to a chew treated with a higher concentration of the same enzyme for a shorter period of time. Lowering the concentration of the enzyme can save money on the cost of the enzyme, but will result in longer processing times. In another example, depending on the type of enzyme, the temperature of the enzyme treating solution can be increased to speed up the enzymatic processes and the enzyme treatment step. The duration of the enzyme treatment, the temperature of the solution during the enzyme treatment, the pH of the solution during enzyme treatment and the amount of enzyme used can also be adjusted to provide a chew having the desired level of degradability while still also providing a chew with the chewable quality expected from a rawhide chew toy such that the dog can chew the article, while exercising its jaws and at the same time can clean its teeth and massage its gums.

Reasonable variation and modification are possible within the foregoing description and drawings without departing from the scope of the invention which is set forth in the appended claims.

The invention claimed is:

1. A chew for a domestic animal comprising:
one or more sheets of a chewable bovine rawhide made from a clean, split bovine hide that has been washed and de-haired, and formed into a shape suitable for chewing by a domestic animal, wherein the one or more sheets has been treated with an enzyme to provide a chew having a mass loss of at least 45% as measured by the Degradability Standard Test Protocol and wherein the enzyme is substantially removed from the one or more sheets upon achieving the mass loss of at least 45% as measured by the Degradability Standard Test Protocol.

2. The chew of claim 1 wherein the one or more sheets have a mass loss of at least 50% as measured by the Degradability Standard Test Protocol.

3. The chew of claim 1 wherein the one or more sheets have a mass loss of at least 60% as measured by the Degradability Standard Test Protocol.

4. The chew of claim 1 wherein the one or more sheets of rawhide are knotted into a bone-like configuration.

5. The chew of claim 1 wherein the treatment to the one or more sheets of the clean, split bovine hide includes treatment with an enzyme solution for a time and temperature to improve the degradability of the bovine rawhide without significantly affecting the chewable quality of the hide.

6. The chew of claim 5 wherein the one or more sheets of clean, split bovine hide are treated with at least one enzyme selected from the group of oxidoreductase, transferase, hydrolase, lyase and isomerase enzyme classes and combinations thereof.

7. The chew of claim 6 wherein the oxidoreductase enzyme is at least one of a peroxidase, catalase, glucose oxidase, laccase and combinations thereof.

8. The chew of claim 6 wherein the transferase enzyme is at least one of a fructosyl transferase, glucosyl transferase and combinations thereof.

9. The chew of claim 6 wherein the hydrolase enzyme is at least one of a lipase, protease, glycosylase and combinations thereof.

10. The chew of claim 9 wherein the hydrolase enzyme is at least one of trypsin, chymotrypsin, pepsin and combinations thereof.

11. The chew of claim 9 wherein the hydrolase enzyme is at least one of a collagenase, a gelatinase and combinations thereof.

12. The chew of claim 6 wherein the hydrolase enzyme is at least one of a serine peptidase, cysteine peptidase, threonine peptidase, glutamic peptidase, aspartic peptidase, metallopeptidase and combinations thereof.

13. The chew of claim 6 wherein the lyase enzyme is at least one of a pectin lyase, pectate lyase, acetolactate decarboxylase and combinations thereof.

14. The chew of claim 6 wherein the isomerase enzyme is at least one of a glucose isomerase, xylose isomerase and combinations thereof.

15. The chew of claim 1 wherein a thickness of the one or more sheets of rawhide is greater than 0.5 mm.

16. The chew of claim 1 wherein a thickness of the one or more sheets of rawhide is between approximately 1.6 to 1.8 mm.

17. The chew of claim 1 wherein the one or more sheets of rawhide has been made with a process that includes treatment with a deliming solution prior to treatment with an enzyme solution followed by washing of the one or more sheets to remove the enzyme solution.

\* \* \* \* \*